Jan. 13, 1925.

A. E. SWAYZE ET AL 1,523,311

AUTOMOBILE DOOR CONTROLLING STEP

Filed April 9, 1923

INVENTOR.
A. E. Swayze and
W. A. Ellis.
BY Geo. P. Kimmel
ATTORNEY.

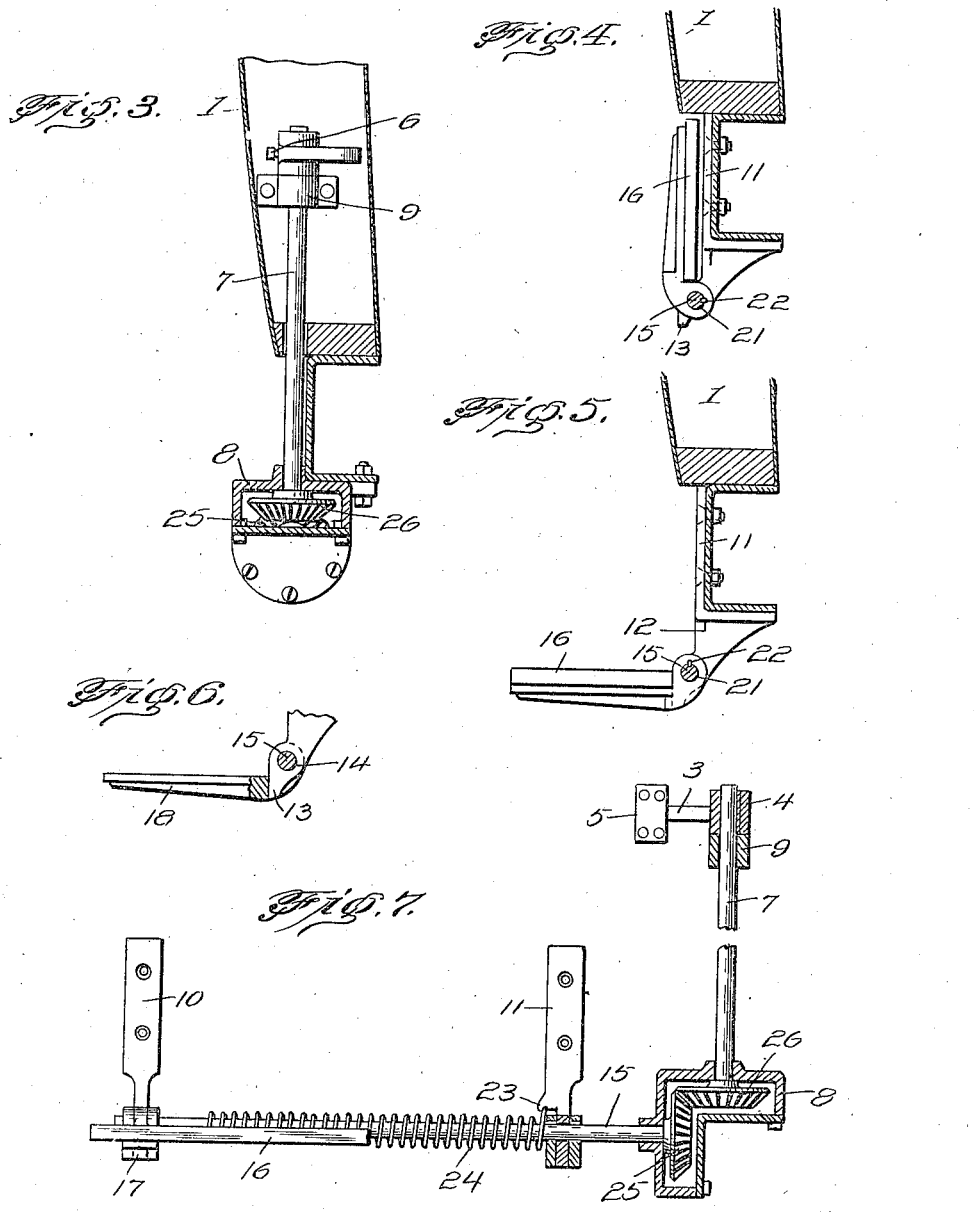

Patented Jan. 13, 1925.

1,523,311

UNITED STATES PATENT OFFICE.

AUSTIN E. SWAYZE AND WILLIAM A. ELLIS, OF SAN ANTONIO, TEXAS.

AUTOMOBILE DOOR-CONTROLLING STEP.

Application filed April 9, 1923. Serial No. 630,838.

*To all whom it may concern:*

Be it known that we, AUSTIN E. SWAYZE and WILLIAM A. ELLIS, citizens of the United States, residing at San Antonio, in the county of Bexar and State of Texas, have invented certain new and useful Improvements in Automobile Door-Controlling Steps, of which the following is a specification.

This invention relates to an automobile door controlled step lowering and elevating mechanism, and has for its object to provide, in a manner as hereinafter set forth, means whereby when the door is opened, the step is lowered into position for use, and when the door is closed, the step is raised against the outer face of the body of the vehicle and held in such position against accidental displacement.

A further object of the invention is to provide, in a manner as hereinafter set forth, a step lowering and elevating mechanism for automobiles, having means whereby the step normally assumes a raised or elevated position and when lowered a horizontal position for use when the door is opened, the parts co-ordinating in their action so that on opening the door of the automobile to permit of the entrance or exit of a passenger, the step is extended in a horizontal position for use, and when the door is closed the step is raised to a vertical position against the side of the body of the automobile and out of the way.

Further objects of the invention are to provide a step lowering and elevating mechanism controlled by the opening and closing of an automobile door and designed primarily for use in connection with automobiles and which is simple in its construction and arrangement, automatic in its operation, strong, durable, compact, not in any manner marring the appearance of the vehicle body, thoroughly efficient in its use, readily installed, and comparatively inexpensive.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 3 is a detail section illustrating the means operated from the door of the automobile for actuating the shifting means for the step.

Figure 4 is a detail section illustrating the connection between the step and the side of the body of the vehicle and further illustrating the step in its raised position.

Figure 5 is a view similar to Figure 4 with the step in its lowered position.

Figure 6 is an end view, partly in section, of the step.

Figure 7 is a sectional elevation of a step lowering and elevating mechanism in accordance with this invention.

Figure 1:
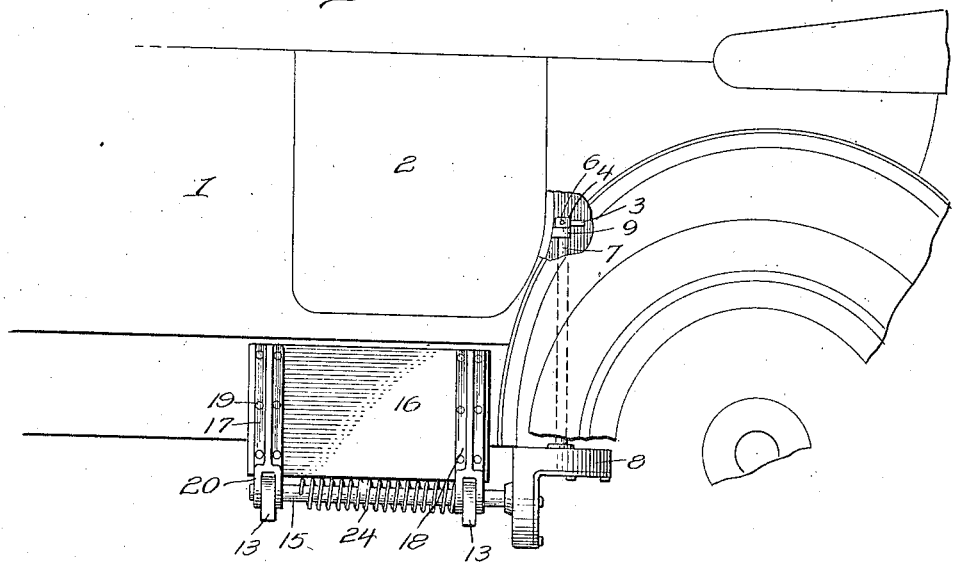
Figure 1 is a side elevation of a portion of the body of an automobile, with the side entrance door closed and further showing the adaptation with said automobile body of a step lowering and elevating mechanism in accordance with this invention, the step being shown as raised or in an inactive position.

Referring to the drawings in detail, 1 denotes the body of an automobile, of any suitable type, and which need not be described in detail, but which is provided with a hinged door 2.

As illustrated, the door 2 is shown provided with a lower hinge and which consists of a curved arm 3, having at one end a collar 4, and at its other end a base plate 5, which is fixedly secured to the door 2. The collar 4 carries a clamping screw 6, for connecting therewith a vertically disposed elongated pintle shaft 7, which depends below the bottom of the body of the vehicle and into an angle-shaped gear casing 8, which is fixedly secured in any manner to the body 1.

The connecting of the shaft 7, to the lower hinge of the door 2, will cause the shaft 7 to turn with the door when the latter is opened or closed.

Secured to the body 1, of the automobile, is a bearing 9 for the collar 4, and through said bearing 9 extends the shaft 7. The collar 4 is seated on the bearing 9. The shaft 7 is arranged between the outer wall of the body 1 and the upholstery of the automobile whereby the shaft 7 is concealed in a manner as shown in dotted lines in Figures 1 and 2.

Secured to the body 1 of the automobile, directly below the door 2, is a pair of vertical hangers 10, 11, which are angle-shaped in contour and each of which is formed with a depending extension 12, offset as at 13, to provide a stop lug. The extensions 12, at a point above the lower end of the lugs 13, are formed with an opening 14, and extending through said openings 14 is a rock shaft 15, which constitutes a means, when operated, to elevate and lower the step 16.

Fixedly secured to the shaft 15, so as to move therewith, is a pair of step supports 17, 18, upon the upper face of which is mounted the step 16, and said supports 17, 18, are fixedly secured to the steps 16 by the hold-fast devices 19. The inner end of each of the supports 17, 18, is yoke-shaped, as at 20, and apertured as at 21, for the passage of the shaft 15. Keys 22 are employed for fixedly securing the supports 17, 18 to the shaft 15.

The hanger 11 is formed with a laterally disposed apertured lug 23, to which one end of a coiled spring 24 is secured. The other end of the coiled spring 24 is connected to the shaft 15. The coiled spring 24 is mounted on the shaft 15. The step 16 extends in close proximity to the spring 24, as clearly shown in Figure 1.

The shaft 15 projects rearwardly from the support 18 and into the gear casing 8. That end of the shaft 15 which projects into the gear casing 8 has fixed therewith a beveled pinion 25, which meshes with the beveled pinion 26 carried by that end of the shaft 7 which extends into the casing 8.

Figure 2:
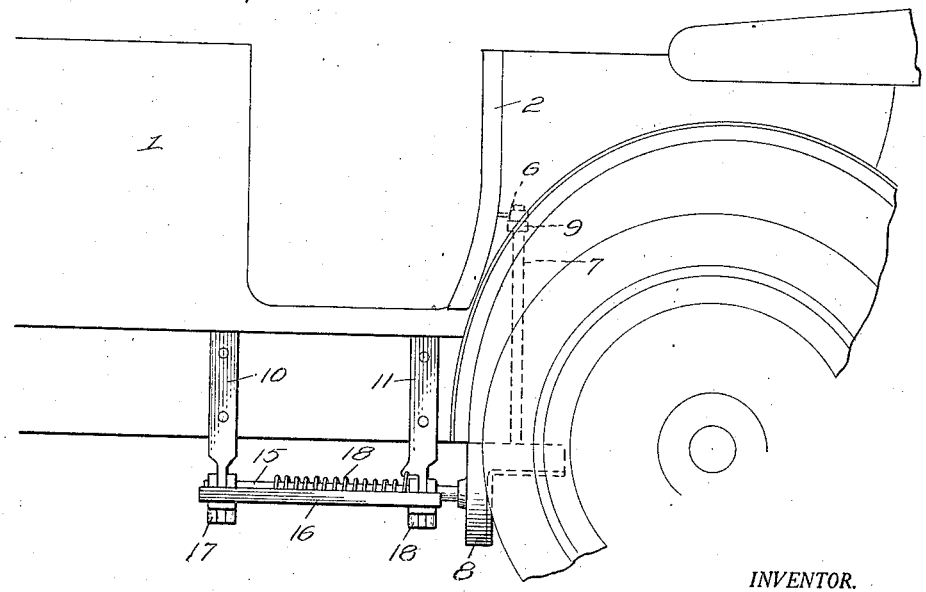
Figure 2 is a view similar to Figure 1 with the side door of the automobile opened and with the step lowered and extended into position for use.

When the door 2 is closed, the parts will be in the position as shown in Figure 1, but when the door 2 is open, the lower hinge thereof, will shift the pintle shaft 7, thereby rocking the shaft 15, due to the inter-meshing of the pinions 25, 26, and such movement of the shaft 15 will cause the step 16 to be shifted to the position shown in Figure 2, and the step 16 will remain in such position as long as the door is open. When the door is closed the pintle shaft 7 will be actuated in the direction opposite to that to which it is moved when the door is opened, and under such conditions the pinions 25, 26, will be operated in an opposite direction causing thereby the elevating of the step 16, but the elevation of the step 16 will be assisted by the spring 24. The lowering of the step 16 is had against the action of the spring 24.

Although the preferred embodiment of the door controlled step lowering and elevating mechanism is as described and illustrated, yet it is to be understood that changes in the details of construction can be had which will fall within the light of the invention as claimed.

What we claim is:—

1. In an automobile door step controlling mechanism, a step support comprising a plurality of vertically disposed hangers adapted to be secured to one side of the vehicle body and each formed with a depending extension having the lower terminus thereof offset forwardly to provide a vertically disposed stop lug, a plurality of step supporting members each provided at its rear end with an upwardly extending right angularly disposed yoke offset rearwardly from said rear end and straddling one of said lugs, said rear end providing a shoulder between the lower end of the yoke and against which engages the lower portion of the lug when the member is in lowered position, and a shiftable shaft common to and fixed to each of said yokes and journalled in said extensions.

2. In an automobile door step controlling mechanism a step support comprising a plurality of vertically disposed hangers adapted to be secured to the outer side of the automobile body and each provided with means at its lower end to form a vertically disposed forwardly offset stop lug, a plurality of shiftable step supports each having its rear end provided with a rearwardly offset vertically disposed yoke-shaped portion straddling one of said lugs, each of said supports having its rear end providing a shoulder arranged between the yoke shaped portion adapted to be engaged by the lower portion of a lug when the support is in a lowered position whereby the support will extend forwardly at right angles with respect to a hanger, and a shifting shaft common to said supports and fixedly secured to said yoke-shaped portions and journalled in the upper ends of said lugs.

In testimony whereof, we affix our signatures hereto.

AUSTIN E. SWAYZE.
WILLIAM A. ELLIS.